United States Patent
Mitchell et al.

(10) Patent No.: US 7,017,811 B2
(45) Date of Patent: Mar. 28, 2006

(54) ELECTRONIC CARD ENCODER

(75) Inventors: Ernst Kern Mitchell, Sterling Heights, MI (US); Mohamad A. Khalil, Sterling Heights, MI (US)

(73) Assignee: Computerized Security Systems, Troy, MI (US)

( * ) Notice: Subject to any disclaimer, the term of this patent is extended or adjusted under 35 U.S.C. 154(b) by 0 days.

(21) Appl. No.: 10/848,331

(22) Filed: May 18, 2004

(65) Prior Publication Data
US 2005/0258244 A1    Nov. 24, 2005

(51) Int. Cl.
*G06K 7/08* (2006.01)

(52) U.S. Cl. .................. 235/449; 235/435; 235/475; 235/487

(58) Field of Classification Search ........... 235/449, 235/451, 435, 439, 492, 493, 475, 479, 483, 235/485, 486–487
See application file for complete search history.

(56) References Cited

U.S. PATENT DOCUMENTS

| | | | | |
|---|---|---|---|---|
| 3,760,391 A | * | 9/1973 | Wolf et al. ................... 360/88 |
| 3,784,796 A | * | 1/1974 | Namikawa et al. ......... 360/131 |
| 4,141,044 A | * | 2/1979 | Kistner et al. ................ 360/2 |
| 4,304,992 A | * | 12/1981 | Kobayashi et al. .......... 235/449 |
| 4,390,905 A | * | 6/1983 | Tokitsu ........................... 360/2 |
| 4,711,993 A | | 12/1987 | Kosednar et al. |
| 4,812,632 A | * | 3/1989 | Kakinuma et al. .......... 235/479 |
| 4,833,310 A | * | 5/1989 | Shimamura et al. ........ 235/479 |
| 4,886,957 A | * | 12/1989 | Glaberson et al. .......... 235/482 |
| 5,079,413 A | * | 1/1992 | Sasaki ........................ 235/479 |
| 5,089,694 A | * | 2/1992 | Zerfahs et al. .............. 235/486 |
| 5,206,489 A | * | 4/1993 | Warwick ..................... 235/449 |
| 5,285,433 A | * | 2/1994 | Oshiba et al. ............ 369/44.26 |
| 5,331,144 A | * | 7/1994 | Shima et al. ................ 235/486 |
| 5,332,891 A | * | 7/1994 | Togawa ....................... 235/485 |
| 5,434,404 A | * | 7/1995 | Liu et al. ..................... 235/475 |
| 5,473,505 A | * | 12/1995 | Kessoku et al. ............. 361/684 |
| 5,650,606 A | * | 7/1997 | Baus, Jr. ...................... 235/449 |
| 5,689,105 A | * | 11/1997 | Mizoguchi et al. ......... 235/475 |
| 5,768,143 A | * | 6/1998 | Fujimoto ..................... 700/235 |
| 5,798,507 A | * | 8/1998 | Kawagishi et al. ......... 235/380 |
| 5,847,371 A | * | 12/1998 | Ieda ............................ 235/441 |
| 5,912,446 A | * | 6/1999 | Wong et al. ................. 235/449 |
| 5,939,694 A | * | 8/1999 | Holcomb et al. ........... 235/381 |
| 5,959,289 A | * | 9/1999 | Okada et al. ............... 235/487 |

(Continued)

FOREIGN PATENT DOCUMENTS

JP     60258691     12/1985

(Continued)

OTHER PUBLICATIONS

International Search Report, Jun. 16, 2005.

*Primary Examiner*—Jared J. Fureman
*Assistant Examiner*—Daniel Walsh
(74) *Attorney, Agent, or Firm*—Carlson, Gaskey & Olds

(57) ABSTRACT

A key card encoder incorporates a plunger that is pushed downward as the card is manually inserted into a slot in the encoder and a potentiometer whose value changes based on the plunger position to indicate the card's position at all times. As the card is inserted into the slot, a head encodes a magnetic strip on the card as the card is inserted into the slot, while the head verifies the code in the reverse direction as the card is withdrawn from the slot. The slot is illuminated in different colors and flashing patterns to guide the user through the encoding process and notify the user if there is an encoding error.

31 Claims, 3 Drawing Sheets

U.S. PATENT DOCUMENTS

| | | | |
|---|---|---|---|
| 6,087,955 A * | 7/2000 | Gray | 340/5.74 |
| 6,138,916 A * | 10/2000 | Zolkos et al. | 235/475 |
| 6,247,644 B1 * | 6/2001 | Horne et al. | 235/380 |
| 6,402,033 B1 * | 6/2002 | Ohrn et al. | 235/441 |
| 6,464,143 B1 * | 10/2002 | Oki et al. | 235/475 |
| 6,616,050 B1 * | 9/2003 | Oki et al. | 235/479 |
| 6,691,917 B1 * | 2/2004 | Orii | 235/449 |
| 6,742,706 B1 * | 6/2004 | Sakamoto et al. | 235/439 |
| 6,752,321 B1 * | 6/2004 | Leaming | 235/492 |
| 2001/0020640 A1 * | 9/2001 | Yokochi | 235/380 |
| 2001/0052546 A1 | 12/2001 | Imai | |
| 2002/0030110 A1 * | 3/2002 | Sakamoto et al. | 235/475 |
| 2002/0079373 A1 * | 6/2002 | Oki et al. | 235/475 |
| 2002/0117550 A1 * | 8/2002 | Hirasawa | 235/479 |
| 2002/0145051 A1 * | 10/2002 | Charrin | 235/492 |
| 2004/0000588 A1 * | 1/2004 | Cheng | 235/441 |
| 2004/0089723 A1 * | 5/2004 | Moriya | 235/475 |
| 2004/0129773 A1 * | 7/2004 | Lute et al. | 235/379 |
| 2004/0159699 A1 * | 8/2004 | Nelson et al. | 235/379 |
| 2004/0173678 A1 * | 9/2004 | Wu | 235/441 |
| 2004/0178258 A1 * | 9/2004 | Scarafile et al. | 235/379 |
| 2004/0262389 A1 * | 12/2004 | Nagata et al. | 235/441 |
| 2004/0262390 A1 * | 12/2004 | Orii | 235/449 |
| 2005/0023348 A1 * | 2/2005 | Lucas et al. | 235/440 |
| 2005/0116036 A1 * | 6/2005 | Akahane et al. | 235/449 |

FOREIGN PATENT DOCUMENTS

| | | |
|---|---|---|
| WO | WO 90/09642 | 8/1990 |
| WO | WO 95/14284 | 5/1995 |

* cited by examiner

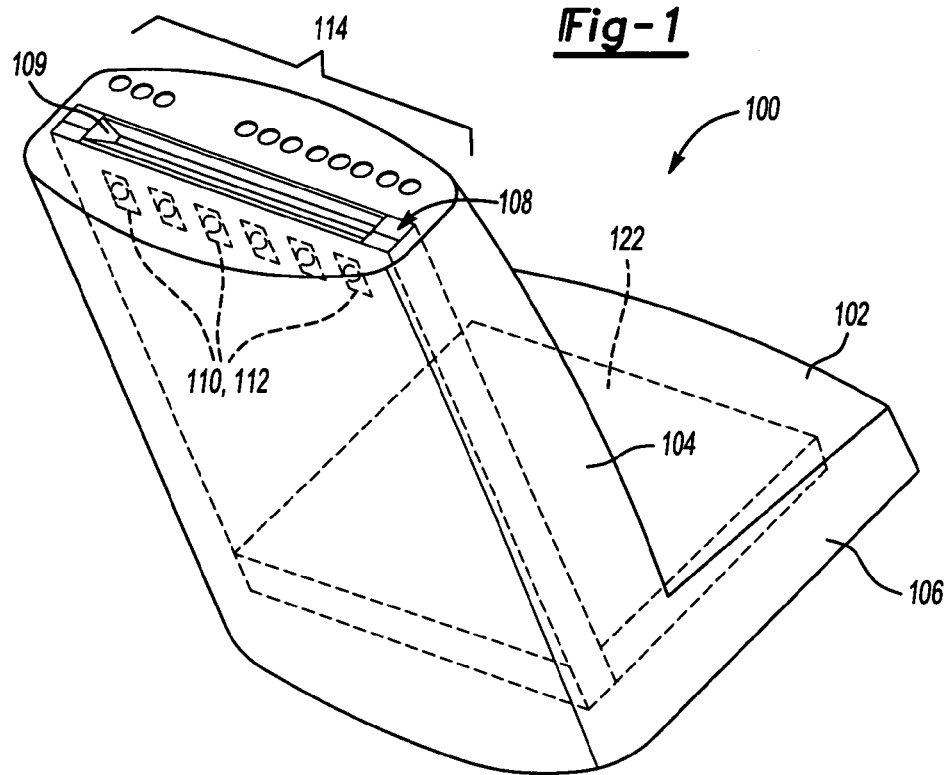
Fig-1
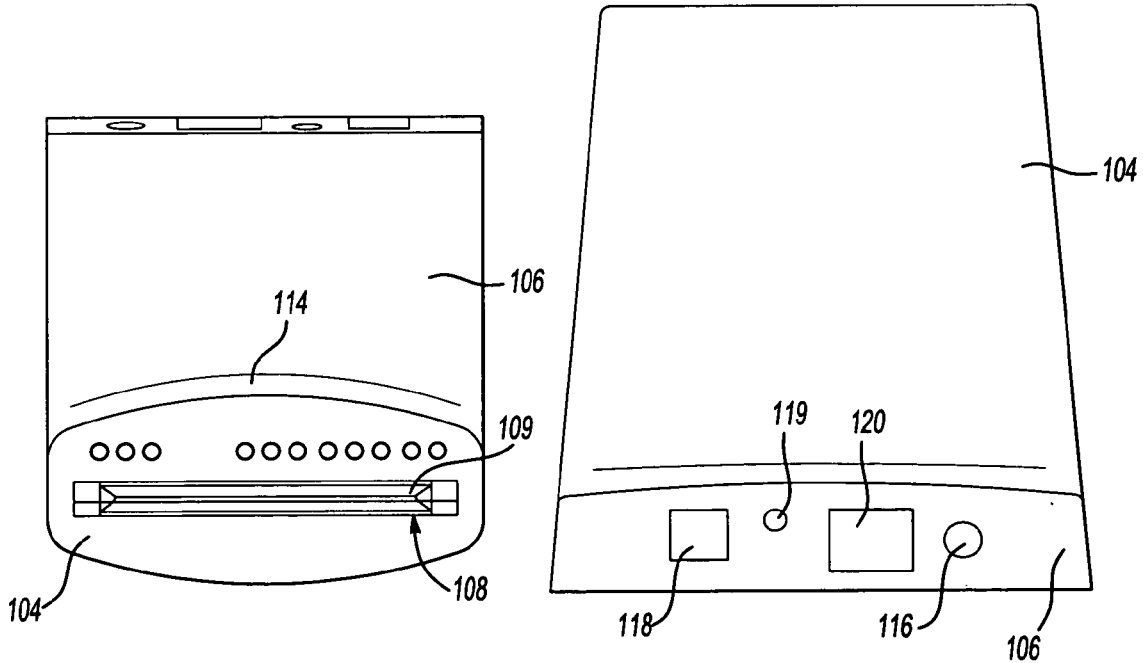
Fig-2
Fig-3

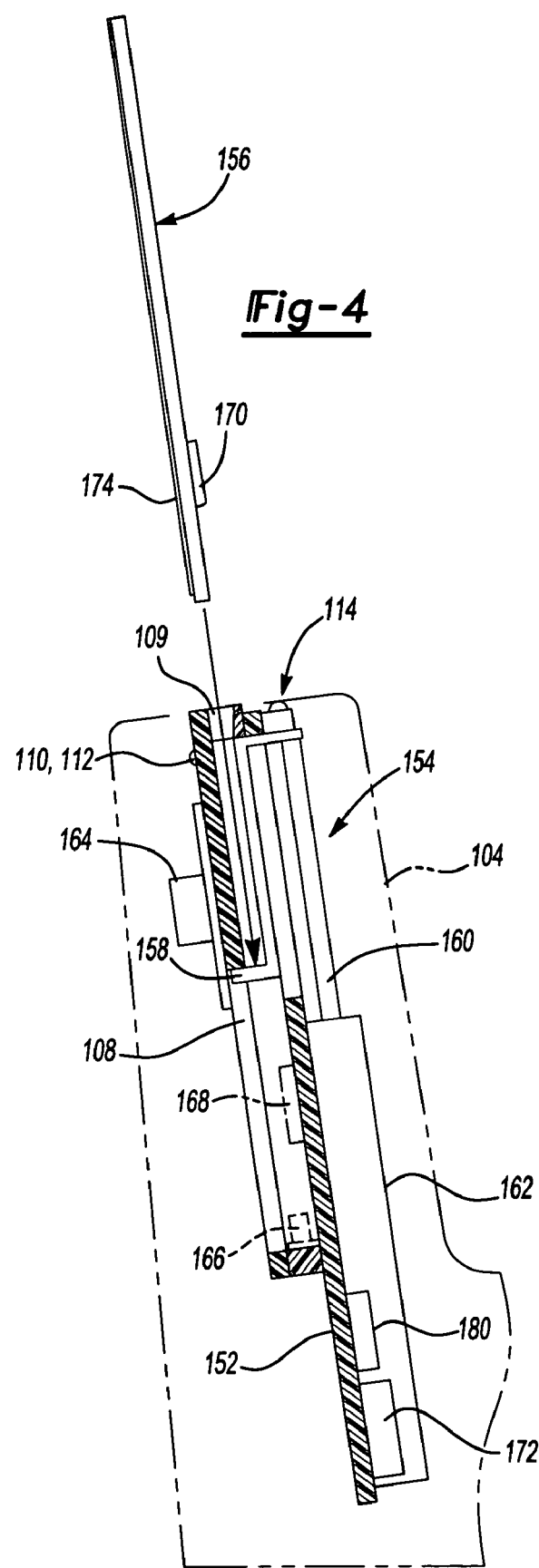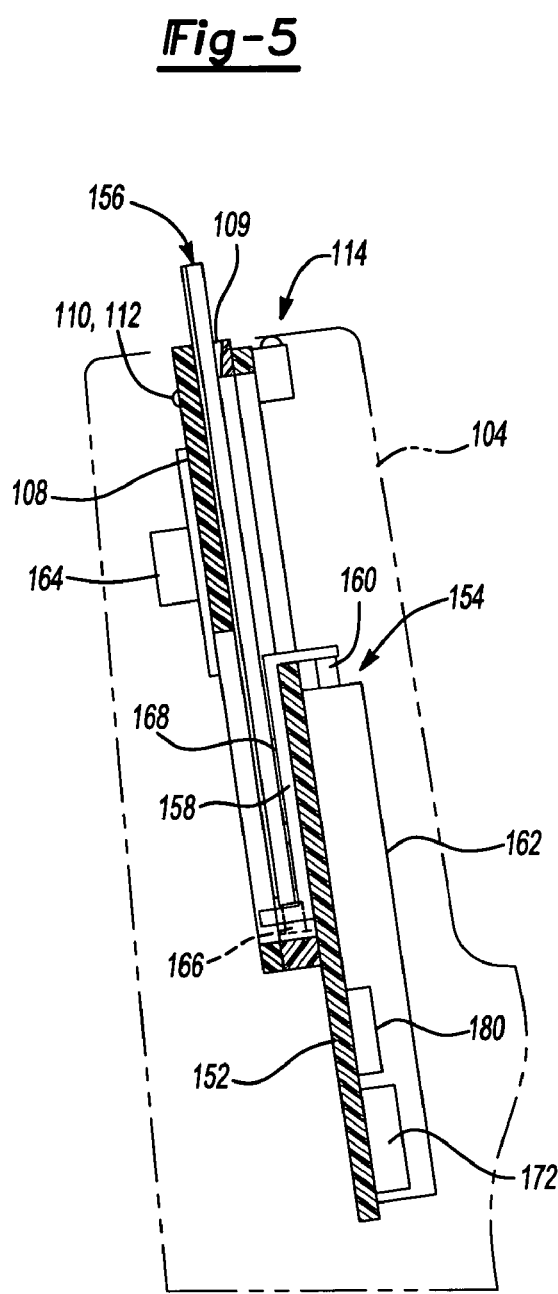

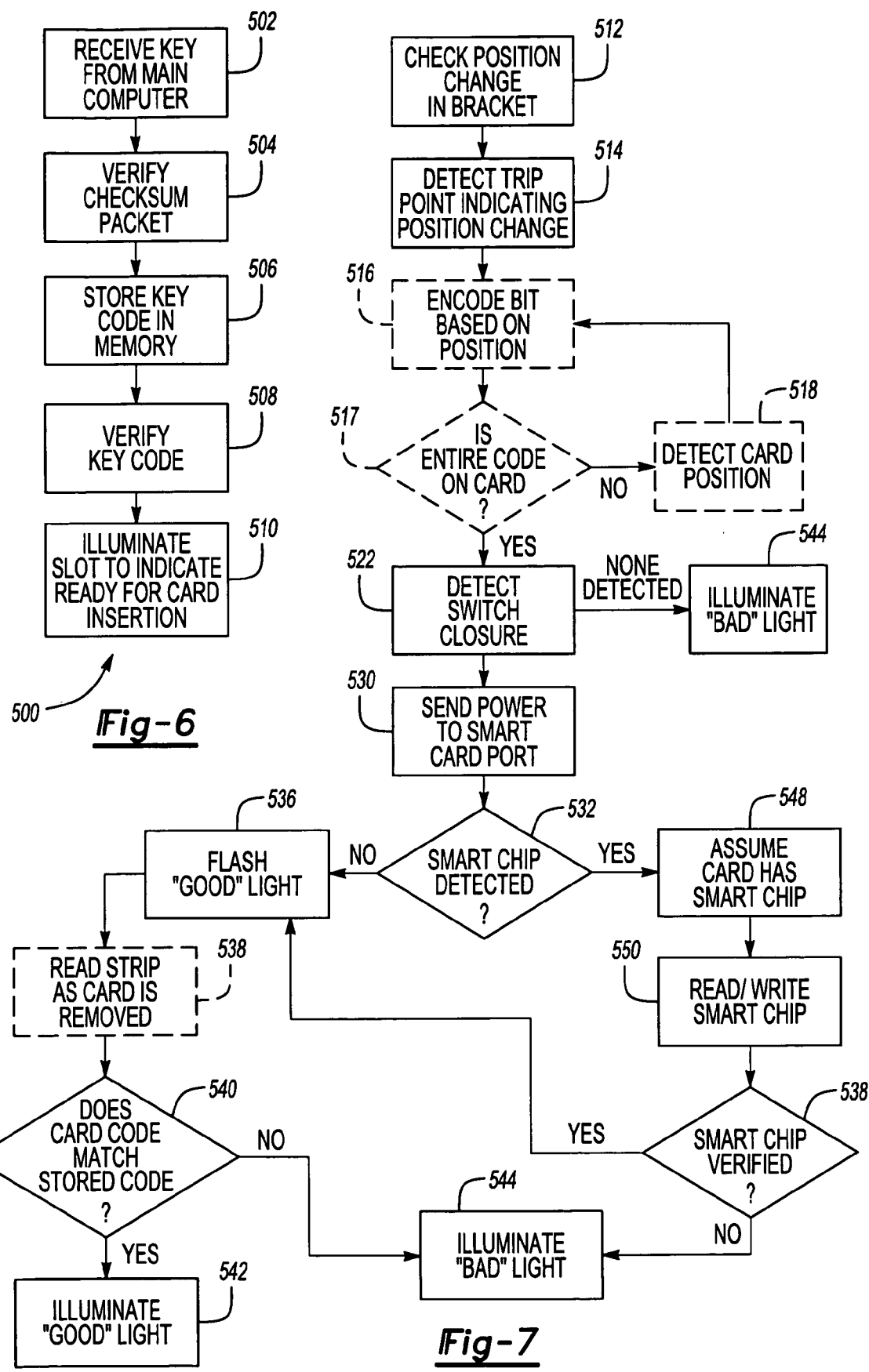

ELECTRONIC CARD ENCODER

TECHNICAL FIELD

The present invention relates to electronic card encoders.

BACKGROUND OF THE INVENTION

Electronic key card encoders are often used to produce customized electronic key cards at a point of transaction, such as at a hotel desk. Generally, key encoders carry out an encoding function and a readback function to ensure that the key is properly encoded. As is known in the art, key cards have a magnetic strip that is encoded by the key encoder with a particular unique code. To ensure that the code will be read back properly when it is inserted into a lock, the code must be encoded in a specific zone on the magnetic strip. Thus, key card encoders must be designed so that the location of the card being encoded is known at all times during the encoding and card reading process.

Currently, there are two types of key encoders in common use. One encoder structure is a narrow, rectangular structure having a slot along its length. A gate detects when the edge of the card passes through a given location in the slot to locate the card, ensuring that a record head encodes the card in the required zone. To encode the key card, a user grasps the card and manually swipes it along the entire length of the slot. As the card passes through the slot, the gate trips, prompting the record head to begin encoding the magnetic strip and the read head to confirm proper encoding.

The manual encoding process for this type of structure, however, makes user error common. If the user does not keep the key card firmly in the slot along its entire length (e.g., if the user inserts or removes the card at an angle before the entire magnetic strip is encoded, the resulting key card will have the code deposited at the wrong location on the strip and/or have an incomplete code on the strip. This improper code location and format makes it impossible to erase and re-encode the card because the read head cannot locate a code that is does not start and stop in the required zone. The card must therefore be discarded. Further, the manual encoding structure requires two heads (i.e., a record head and a read head), increasing the complexity of the structure.

To eliminate the possibility of human error in manually swiping the key card through an encoder, an alternative key encoder structure includes rubberized wheels and a motor that pull the card inside a box through a front slot. In this structure, there is a single head that conducts both the encoding and the reading. The wheels pull the card forward to pass the magnetic strip past the head for encoding, pushes the card backward to rewind the card, then pulls the card forward to repass the strip against the head so that the head can read the encoded strip and confirm proper encoding. Once the head confirms that the card is properly encoded, the encoder pushes the card backward again to eject it through the front slot. Although the wheels and motor ensure that the code will be deposited in the required zone, this structure also requires the card to be passed repeatedly past the heads, increasing wear on the encoder components. The motor and wheels can also degrade over time, requiring replacement.

There is a need for a simple, inexpensive key encoder that is not susceptible to encoding errors.

SUMMARY OF THE INVENTION

The present invention is directed to a key card encoder that greatly reduces key encoding errors without relying on any motorized mechanisms to move the card. Instead, movement of the card is conducted manually. In one embodiment, the encoder has a plunger that is pushed downward as the card is inserted into a slot in the encoder. The position of the plunger controls a value of an electronic component, such as a potentiometer. As a result, the value of the electronic component corresponds with the position of the card, allowing the card's position and direction to be tracked at all times during the encoding process if desired. At a minimum, the potentiometer value allows the invention to ensure that a code on the card starts and stops within a desired range.

As the card is inserted into the slot, a head encodes a magnetic strip on the card. When the card is fully inserted, a switch is tripped, prompting the encoder to check for a smart chip on the card and encode the smart chip if one is present. As the card is withdrawn, the head reads the code on the magnetic strip to verify that the card was correctly encoded, taking into account that the code will be read in the reverse direction.

In one embodiment, the slot is illuminated to guide the user through the encoding process. For example, the slot may be steadily illuminated in a first color to indicate that the encoder is ready to accept a card for encoding, flash in the first color after the card is inserted to indicate that the card is ready to be removed and verified, and be illuminated in a second color if there is an error anytime during the encoding process. Illuminating the slot provides users with unambiguous feedback, further reducing the likelihood of encoding errors.

By eliminating motorized components while restricting manual card movement, the inventive system offers a simple way to reliably encode key cards while keeping the encoder structure compact and inexpensive.

BRIEF DESCRIPTION OF THE DRAWINGS

FIG. 1 is a perspective view of a key encoder according to one embodiment of the invention;

FIG. 2 is a top plan view of the key encoder of FIG. 1;

FIG. 3 is a rear plan view of the key encoder of FIG. 1;

FIG. 4 is a representative diagram of inner components of the key encoder according to one embodiment of the invention before a key card is inserted;

FIG. 5 is a representative diagram of the components in FIG. 3 after a key card is inserted into the encoder;

FIG. 6 is a flow diagram of a key card initialization method carried out in one embodiment of the invention; and FIG. 7 is a flow diagram of a key card encoding and verification method carried out in one embodiment of the invention.

DETAILED DESCRIPTION OF THE EMBODIMENTS

FIGS. 1 through 3 illustrate a key encoder 100 according to one embodiment of the invention as seen from the outside of the encoder 100. Referring to FIG. 1, the encoder 100 includes a generally L-shaped housing 102 with a card insertion portion 104 and a base portion 106. In one embodiment, the angle between the card insertion portion 104 and the base portion 106 is around 100 degrees (i.e., 10 degrees off from perpendicular). The angled housing, in conjunction with the compact configuration of the encoder's inner components (described in greater detail below) minimizes the amount of desk space that the key encoder 100 occupies.

FIG. 2 is a representative top plan view of the key encoder 100 of FIG. 1 to show the card insertion portion 104 in more detail. The card insertion portion 104 includes a slot portion 108 having a slot 109 that accommodates a standard key card. The slot 109 preferably is slightly larger than the key card so that the card can be inserted easily into the slot 109 but not be able to move within the slot 109, preventing misalignment between the magnetic strip and/or smart chip on the card and an encoding head within the encoder 100 that reads data from and writes data to the card.

In one embodiment, the slot portion 108 is made of a translucent material that contains pockets or bevels to distribute light from at least one slot light source, such as an LED. In the illustrated embodiment, the slot 109 can be illuminated by two different color LEDs, a "good" color (e.g., blue or green) LED 110 indicating proper encoding and a "bad" color (e.g., red) LED 112 indicating improper encoding. By distributing the light from the light sources 110, 112 evenly so that the slot portion 108 is clearly illuminated, the slot portion 108 offers users unmistakable feedback on the success or failure of the card encoding process, making the encoder 100 easier to read than existing encoders with small indicator lights.

To provide additional feedback, the card insertion portion 104 has a plurality of indicator lights 114 corresponding to, for example, card encoding status and transmission status. The indicator lights 114 provide additional feedback on the encoder's operation without interfering with the primary feedback provided by the illuminated slot 109.

FIG. 3 shows the base portion 106 in more detail. In one embodiment, the base portion 106 includes a power connection port 116 to connect the encoder 100 to a power source and at least one data port that carries data between the encoder 100 and, for example, a computer or other user interface (not shown). For example, the data ports may include a USB port 118, an RS232 serial port 119, and/or a TCP/IP (Ethernet) port 120. Other data ports and their corresponding circuitry can be incorporated into the encoder 100 via any known method.

FIGS. 4 and 5 are representative section diagrams illustrating inner components of the key encoder according to one embodiment of the invention. Note that FIGS. 4 and 5 are not drawn to scale; it is to be understood, for example, that the various components are positioned so they can read from and write to corresponding areas (e.g., magnetic strips, smart chips, etc.) on a key card. The illustrated components are disposed within the card insertion portion 104 of the housing, outlined in phantom in FIGS. 4 and 5. Components disposed in the base portion 106 of the encoder 100 are omitted for clarity, but generally the base portion 106 can house a communication printed circuit board (PCB) 122 that supports, for example, any known circuitry that carries data and power between the encoder 100 and an outside computer.

In the illustrated embodiment, the card insertion portion 104 houses a encoder PCB 152 that supports the translucent slot portion 108, the light sources 110, 112 that illuminate the slot portion, and the indicator lights 114. The encoder PCB 152 generally contains card encoding processing and customer interface devices (e.g., visual indicators, LEDs, etc), while the communication PCB 122 contains communication devices that act as a gateway between the encoder PCB 152 and the electrical input/output infrastructure via the data ports 118, 119, 120. The communication PCB 122 can be selectively populated to provide multiple I/O ports or can be populated for specific applications requiring only one port to reduce cost.

Also, the encoder PCB 152 and the communication PCB 122 are separable, making it possible to modify the communication PCB 122 without any changes to the encoder PCB 152. As a result, the encoder PCB 152 can be manufactured the same way, regardless of the specific application, and be mated to a communication PCB 122 having any configuration (e.g., a specifically-configured communication PCB 122 having one or two ports or a fully versatile communication PCB 122 having all three ports) to provide customization. Thus, creating a separable encoder PCB 152 and communication PCB 122 makes it possible to customize the communication ports of the encoder 100 by modifying the communication PCB 122 alone, thereby preserving the economies of scale that are possible in manufacturing a standardized encoder PCB 152.

In one embodiment, a sliding mechanism 154 is mounted onto the encoder PCB 152 and is used to monitor the position of the key card 156 as it is inserted into the slot 109 and to detect the position of the card 156 is it is being inserted. In one embodiment, the sliding mechanism 154 includes a bracket 158, a spring-biased plunger 160, and a variable output electronic component, such as a potentiometer 162. The potentiometer 162 operates in tandem with a head 164 that conducts both read and write operations. The bracket 158 may be positioned so that the card 156 is inserted partway into the slot 109 before the plunger 160 actually starts moving; this bracket position may correspond to, for example, a standard start position for the encoding on the strip.

A switch 166 disposed at the bottom of the slot portion 108 trips when the plunger 160, and therefore the card, reaches its lowest point, indicating that the card is inserted completely into the slot 109. The encoder PCB 152 also supports a smart card port 168 to accommodate key cards 156 having smart chips 170. A processor 172 is connected to the potentiometer 162, the head 164, the smart card port 168, the switch 166, and the lights 110, 112, 114 to coordinate the reading and encoding processes with the card position and light illumination. A memory 180 stores the code to be encoded on the key card 156 and is accessible by the processor 172.

The sliding mechanism 154 should be calibrated via any known process (e.g., by storing the desired potentiometer value positions in the processor 172) so that a code will be deposited at the correct location (e.g., within selected start and stop boundaries) on a magnetic strip 174. This calibration process compensates for manufacturing differences between the potentiometer 162 and the bracket 158 so that the head 164 will encode the magnetic strip 174 on the key card 156 at the same location regardless of the manufacturing differences. Note that the potentiometer 162 provides an analog position detection system in the encoder 100 rather than a digital one, reducing complexity and cost.

Once the sliding mechanism 154 is calibrated, the potentiometer 162 will accurately reflect the position of the card 156. More particularly, as the card pushes the plunger 160 downward, the position of the plunger 160 changes the potentiometer 162 value. In one embodiment, the potentiometer value varies linearly with the plunger position. The potentiometer 162 is monitored by the processor 172. As the potentiometer 162 reaches selected threshold values, the processor 172 instructs the head 164 to encode a bit onto the magnetic strip 174 (if the card is being inserted) or read from the magnetic strip 174 (if the card is being removed) at each card position corresponding to the threshold value. The potentiometer value can be used to check the start and end positions of the code on the magnetic strip 174 and check the position of each individual bit during encoding. Note that although the head 164 encodes or reads individual bits, it is not necessary to check for the location of each bit independently during the read operation; checking the overall position of the code on the magnetic strip 174 is sufficient for reading.

Once the card 156 is fully inserted into the slot 109, the bottom edge of the card 156 trips the switch 166, indicating to the processor 172 that the card 156 is in position to be checked for a smart chip 170 by the smart card port 168. Note that if the card 156 is removed before it trips the switch 166, the biasing force of the plunger 160 causes the plunger 160 to move back upward. The processor 172 detects the change in the potentiometer value caused by this upward movement and sends a signal to the "bad" LED 112 to illuminate the slot 109 and notify the user that an error has occurred.

When the card 156 is removed after being checked for a smart chip 170, the biasing force of the plunger 160 causes the plunger 160 to track the card's movement out of the slot 109, changing the potentiometer value. As the card 156 is removed, the head 164 may read each bit corresponding to the position indicated by the potentiometer value to verify that the magnetic strip 174 was properly encoded. Because the encoded magnetic strip 174 will be read backwards by the head 164, the processor 172 compensates for this fact when comparing the code on the magnetic strip 174 with the code stored in the memory 180.

FIGS. 6 and 7 illustrate a process carried out by the key encoder 100 according to one embodiment of the invention in greater detail. The process 500 shown in FIG. 6 illustrates a process conducted by the encoder 100 before the card 156 is inserted into the slot 109. The encoder 100 first receives a key code to be encoded onto the card (e.g., 136 bits) from, for example, the main computer (not shown) through one of the ports 118, 119, 120 (block 502). The processor 172 then checks a checksum packet in the key code to verify that the key code has the expected number of bits and is otherwise accurate (block 504). Once the key code has been verified, the processor 172 stores the key code in an encoding buffer (block 506) and carries out an encoder verification module to verify that the key code has the proper number of bits and format (block 508). Once the key code has been verified, the key code is stored in the memory 180 and the slot portion 108 is illuminated with a steady light (e.g., a green or blue light) to indicate that the encoder 100 is ready to accept card insertion (block 510).

Referring to FIG. 7, the processor 172 checks for any change in the bracket 158 position by checking for changes in the potentiometer 162 value (block 512). Once the key card 156 has been inserted far enough into the slot 109 to start moving the bracket 158, and therefore the plunger 160 (block 514), the resulting change in the potentiometer 162 value indicates to the processor 172 that the card is moving. When the processor 172 detects that the potentiometer 162 value corresponds to the location of the first bit, the head 164 encodes the first bit of the key code onto the key card (block 516). As the card is inserted further into the slot 109 and pushes the plunger 160 downward, the head 164 encodes subsequent bits based on the card position as indicated by the potentiometer 162 value (blocks 516, 517 518). The encoding process continues until the key code is completely encoded onto the card 156 (e.g., 136 bits). Once the card 156 is fully inserted into the slot 109, the switch 166 at the bottom of the slot portion 108 closes (block 522), telling the processor to change the head 164 operation from a write operation to a read operation. Note that if the card is removed before it is fully inserted into the slot 109, it will cause the slot portion 108 to illuminate and flash in the "bad" color, indicating an encoding error (block 544). The processor can detect premature removal of the card 156 if, for example, fewer than the anticipated number of bits are written or read when the potentiometer reverses direction.

Note that the processor can also detect if the card 156 reverses direction, even by a small amount, before it is fully encoded because any backward movement of the card 156 will cause the potentiometer 162 value to change accordingly as the spring-biasing force moves the plunger 160 backward when the card is withdrawn slightly. The head 164 may therefore write a bit in a particular location more than once, if necessary, to maintain code integrity even if the user fails to insert the card smoothly. Thus, by continuously monitoring the card position via the potentiometer 162 value, the inventive encoder 100 can provide reliably high encoding quality without relying on any mechanical devices. Instead, the encoder 100 is able.

FIG. 7 also illustrates optional steps that may be conducted by the encoder 100 to detect and encode and/or read a smart chip 170 on the card 156. Note that the inventive encoder 100 is flexible enough to accommodate both magnetic strip key cards and smart cards with no modification or user input; instead, it can detect and encode both types of cards automatically. Further, the smart chip 170 encoding process can be conducted alone, allowing the encoder 100 to be designed to write/read only smart cards, if desired.

Once the processor 172 detects that the key card is fully inserted, power is sent to the smart card port 168 to activate the port 168 (block 530). The smart card port 168 then checks the inserted key card to determine whether the inserted card has a smart chip 170. To do this, the smart card port 168 sends a signal to the card 156 and waits for an answer back from the card (block 532).

If the inserted key card is not a smart card, the signal from the smart card port 168 will simply be sent to the body of the card (e.g., bare plastic), which will not generate a return signal back to the smart card port 168. If the smart card port 168 does not receive a return signal, the encoder 100 will assume that the inserted key card only has a magnetic strip. The encoder 100 will therefore cause the slot portion 108 to illuminate and flash in the "good" color (e.g., green or blue) to tell the user to remove the card from the slot 109 (block 536).

As the card is removed, the head 164 reads the encoded magnetic strip (block 538). Note that the encoded magnetic strip is read backwards by the head 164 when the card is withdrawn from the encoder 100; this is taken into account when the code read by the head 164 is compared with the code stored by the processor in the memory 180. The encoder 100 then checks whether the code read by the head 164 matches the code stored in the memory 180 (block 540). If the codes match, it indicates that the card was properly encoded. The slot portion 108 will therefore be steadily illuminated in the "good" color after the card is removed to indicate that the code was properly encoded onto the magnetic strip 174 (block 542).

If the code read by the head 164 does not match the code stored in the memory 180, it indicates that the card 156 was not encoded properly. In this case, the processor 172 causes the slot portion 108 to illuminate and flash on and off in the "bad" color (e.g., red) to notify the user of the error (block 544). Note that the illuminated slot portion 108 clearly and unmistakably indicates when the inserted card should be removed and whether or not the encoding was successful by changing the color and the flashing of the lights illuminating the slot portion 108.

If the inserted key card is a smart card (i.e., a card that has a smart chip 170 on it), the smart chip 170 will return a signal in response to the signal from the smart card port. The encoder 100 will therefore assume that the card is a smart card and/or has a memory chip (block 548). The smart card port 168 then reads and/or writes data to the smart chip 170 (block 550) and then compares the code on the chip with a code stored in the memory 180 to verify whether the chip 170 was correctly encoded (block 538). Like the example above, the slot portion 108 will be steadily illuminated in the "good" color after the card is removed if the chip was correctly encoded (block 540) and will flash on and off in the "bad" color after the card is removed if there is an encoding error (block 544). When the card 156 is removed from the slot portion 108, the encoder checks and verifies the code on the magnetic strip (if any) in the manner described above.

Note that the embodiment shown in FIG. 7 assumes that the card either has a magnetic strip or both a magnetic strip and a smart chip. If the card has a smart chip alone, with no magnetic strip, all of the steps relating to encoding a magnetic strip (e.g., blocks 516 through 518 and block 538) can be omitted from the method shown in FIG. 7 without departing from the scope of the invention. As a result, the inventive encoder 100 is flexible enough to encode multiple types of key cards with virtually no change in the encoder 100 itself. As can be seen from the above description, the encoder 100 is designed to encode cards with magnetic strips, cards with smart chips, and cards with both magnetic strips and chips using the same operating procedure for all three types of cards. Thus, the same encoder 100 can encode different types of cards automatically, without requiring any user input to change the encoding procedure.

As a result, the inventive key card encoder system and method relies on manual rather than mechanical movement of the card to position the card, eliminating the need for costly and high-maintenance motors and wheels. Note that although the above examples check for and encode a magnetic strip in every instance, regardless of whether the card has a magnetic strip, a smart card chip, or both, the invention can also be implemented with a magnetic card reader alone or a smart chip reader alone without departing from the scope of the invention with little modification due to the encoder's simple structure. Further, the inventive system provides clear feedback to users via a large, easy-to-read illuminated slot, eliminating any ambiguities caused by unclear displays. By checking the card for both the magnetic strip and the smart chip every time a card is inserted, the inventive system also can encode both magnetic strips and smart chips while still keeping the encoder size and profile compact and the card detection and encoding algorithms simple.

It should be understood that various alternatives to the embodiments of the invention described herein may be employed in practicing the invention. It is intended that the following claims define the scope of the invention and that the method and apparatus within the scope of these claims and their equivalents be covered thereby.

What claimed is:

1. A card encoder, comprising:
   a slot portion having a slot that receives a card;
   a sliding mechanism that changes position as the card changes position within the slot portion;
   an electronic component coupled to the sliding mechanism and having a value corresponding to the position of the sliding mechanism;
   a head that carries out at least one of a read function and a write function on the card;
   a processor in communication with the electronic component and the head, wherein the processor instructs the head to conduct said at least one of the read function and the write function based on the position indicated by the electronic component value; and
   the head conducts the write operation as the card is being inserted into the slot portion and conducts the read operation as the card is being withdrawn out of the slot portion.

2. The card encoder of claim 1, wherein the card encoder further comprises at least one light source that illuminates the slot portion and that is controlled by the processor.

3. The card encoder of claim 2, wherein the slot portion comprises a translucent material that distributes the light from said at least one light source.

4. The card encoder of claim 2, wherein said at least one light source comprises a first light source in a first color and a second light source in a second color.

5. The card encoder of claim 4, wherein the processor illuminates the first light source when the encoder is operating properly and illuminates the second light source when there is an encoder operating error.

6. The card encoder of claim 5, wherein the processor causes the first light source to illuminate when the encoder is ready to accept a card and if an encoding process is successful, causes the first light source to flash when the card is ready to be removed from the encoder.

7. The card encoder of claim 5, further comprising a memory in communication with the processor to hold wherein the processor illuminates the second light source if a number of bits on the card do not match a number of bits storied in memory.

8. The card encoder of claim 1, wherein the electronic component is a potentiometer.

9. The card encoder as set forth in claim 1, wherein said sliding mechanism has a surface contacted by a card inserted into the slot, said sliding mechanism moving with said card, such that movement of said sliding mechanism corresponds to the movement of a card further into the slot.

10. A card encoder, comprising:
    a slot portion having a slot that receives a card;
    a sliding mechanism that changes position as the card changes position within the slot portion;
    an electronic component coupled to the sliding mechanism and having a value corresponding to the position of the sliding mechanism;
    a head that carries our at least one of a read function and a write function on the card;
    a processor in communication with the electronic component and the head, wherein the processor instructs the head to conduct said at least one of the read function and the write function based on the position indicated by the electronic component value; and
    a switch that closes when the card moves the sliding mechanism to a fully inserted position.

11. The card encoder of claim 10, wherein the switch causes the head to switch from a read configuration to a write configuration when the switch is closed.

12. The card encoder of claim 10, further comprising a smart card port in communication with the processor, wherein the processor prompts the smart card port to check the card for a smart chip when the processor detects that the switch is closed.

13. The card encoder of claim 12, wherein the head encodes a magnetic strip, and wherein the processor uses a single operating procedure to encode a card having the magnetic strip alone, a card having the smart chip alone, and a card having both the magnetic strip and the smart chip.

14. The card encoder of claim 1, further comprising a housing that houses the slot portion, the sliding mechanism, the electronic component, the head, and the processor.

15. The card encoder of claim 14, wherein the housing comprises:
a card insertion portion that houses the slot portion, the sliding mechanism, the electronic component, and the head; and
a base portion that houses at least one data port.

16. The card encoder of claim 15, wherein the slot portion, the sliding mechanism, the electronic component, and the head are disposed on an encoder printed circuit board (PCB), and wherein said at least one data port is disposed on a communication PCB, the encoder PCB and the communication PCB being separable.

17. The card encoder of claim 16, wherein said at least one data port on the communication PCB is one selected from the group consisting of a serial port, a USB port, and an Ethernet port to allow customization of the communication PCB independent of the encoder PCB.

18. A method of encoding a card, comprising:
detecting a position of a sliding mechanism in a card encoder, wherein the position of the sliding mechanism corresponds to a position of a card in the card encoder;
writing data to the card based on the detected position as the card is inserted into the card encoder;
reading data from the card as the card is withdrawn from the card encoder; and
the head conducts the write operation as the card is being inserted into the slot portion and conducts the read operation as the card is being withdrawn out of the slot portion.

19. The method of claim 18, wherein the detecting step comprises monitoring a value of an electronic component coupled to the sliding mechanism, wherein the value corresponds to the position of the sliding mechanism.

20. The method of claim 18, wherein the card encoder comprises a slot portion that receives the card, and wherein the method further comprises illuminating the slot portion.

21. The method of claim 20, wherein the illuminating step comprises:
selecting between a first light source in a first color and a second light source in a second color;
illuminating the first light source when the encoder is operating properly; and
illuminating the second light source when there is an encoder operating error.

22. The method of claim 21, wherein illuminating the first light source comprises:
illuminating the first light source steadily when the encoder is ready to accept a card and if an encoding process is successful; and
flashing the first light source when the card is ready to be removed from the encoder.

23. The method of claim 18, further comprising:
detecting when the card reaches a fully inserted position;
checking the card for a smart chip; and
conducting at least one of a read and write operation on the smart chip.

24. The method of claim 18, further comprising:
detecting if the card is partially withdrawn before it reaches a fully inserted position; and
repeating the writing step on a given card location when the card is reinserted after being partially withdrawn.

25. The method of claim 18, further comprising:
storing a code to be written to the card in memory; and
verifying the data from the reading step with a code stored in memory.

26. The method of claim 18, wherein the card encoder is provided with a slot, and a card is inserted into the slot, and the sliding mechanism moving with the card as the card is inserted into the slot and the detecting of the position of the sliding mechanism then being performed.

27. The method as set forth in claim 26, wherein a switch trips when the sliding mechanism reaches a predetermined position indicating that the card is inserted fully within the slot.

28. A card encoder, comprising:
a slot portion having a slot that receives a card;
a sliding mechanism that changes position as the card changes position within the slot portion, said sliding mechanism having a surface contacted by a card inserted into the slot, and said sliding mechanism moving with said card, such that movement of said sliding mechanism corresponds to the movement of a card further into the slot;
a switch that closes when the card moves the sliding mechanism to a fully inserted position;
a smart card port in communication with a processor, wherein the processor prompts the smart card port to check the card for a smart chip when the processor detects that the switch is closed;
and the processor in communication with an electronic component and the smart card port, wherein the processor instructs the smart card port to conduct said at least one of the read function and the write function based on the position indicated by a value of the electronic component.

29. The card encoder of claim 28, wherein the card encoder further comprises at least one light source that illuminates the slot portion and that is controlled by the processor, wherein said at least one light source comprises a first light source in a first color and a second light source in a second color.

30. The card encoder of claim 29, wherein the processor illuminates the first light source when the encoder is operating properly and illuminates the second light source when there is an encoder operating error.

31. The card encoder of claim 30, wherein the processor causes the first light source to illuminate when the encoder is ready to accept a card and if an encoding process is successful, causes the first light source to flash when the card is ready to be removed from the encoder.

* * * * *

UNITED STATES PATENT AND TRADEMARK OFFICE
CERTIFICATE OF CORRECTION

PATENT NO.        : 7,017,811 B2
APPLICATION NO. : 10/848331
DATED             : March 28, 2006
INVENTOR(S)       : Mitchell, Ernst Kern and Khalil, Mohamad A.

It is certified that error appears in the above-identified patent and that said Letters Patent is hereby corrected as shown below:

Column 8, Line 53:

delete "our" and insert --out--

Signed and Sealed this

Twenty-second Day of August, 2006

JON W. DUDAS
*Director of the United States Patent and Trademark Office*